United States Patent Office 2,840,473
Patented June 24, 1958

2,840,473
RUMINANT FEED INGREDIENT

John H. Lux, Baltimore, Md., assignor to Shea Chemical Corporation, Baltimore, Md., a corporation of Maryland No Drawing. Application March 31, 1955
Serial No. 498,422

18 Claims. (Cl. 99—2)

The present invention relates to a new source of nitrogen as an ingredient of feeds to supplement the protein feed of Ruminantia and more especially is directed to providing dicyandiamide and its derivatives as a source of usable nitrogen in feeds for such animals.

Burroughs et al., of the Ohio Agricultural Experimental Station, have called attention to the importance of nutrients needed by rumen microorganisms in the digestion of roughages and particularly the cellulose fraction of their normal feed. (Jour. Animal Science, 9, 523–530, 1950.) From the fact that the feeding of cattle and other ruminant animals often includes the feeding of grains and protein-rich feeds in combination with roughage, Burroughs has postulated that these grains and protein-rich feeds, when fed with roughage, might supply nutritional factors needed by rumen microorganisms in the digestion of the roughage fraction of the ration (Feedstuffs, p. 24, 12–9–50). These investigators present considerable evidence supporting the proposition that grains and other protein-rich feeds contribute to the nutrition of rumen microorganisms in their digestion of cellulose.

Cattle, sheep and goats must be fed large quantities of nitrogen containing mixtures in their feeds for normal growth. Customarily these are supplied as proteins or proteinacious material such as soybean meal, cotton seed meal, corn, etc. These are always fed as part of a balanced diet containing fats, carbohydrates, roughage, vitamins, phosphatic materials, antibiotics, and minerals as needed. There is a shortage of protein in the United States at the present time and in the long range agricultural picture there will be an even greater shortage of protein material as the population grows.

Further work has established that urea and certain other materials can be used as a source of usable nitrogen which may replace a portion, at least, of the protein feed for such animals. By usable nitrogen is meant the nitrogen of a compound that is a food for rumen microflora.

Each pound of nitrogen in the compounded feed is equivalent to approximately 6.25 pounds of protein. This nitrogen is equivalent to the protein feed as such from animal and vegetable sources as far as the metabolism and growth of the animal is concerned. Not all forms of nitrogen are usable by the animals. For example, nitrates cause nitrate poisoning in animals. The nitrate in the food is changed to nitrite in the digestive tract, and when this is absorbed in the blood, it changes the hemoglobin into a form that cannot transport the oxygen, and the animal is asphyxiated.

In the use of urea as a source of usable nitrogen, care must be exercised to control carefully the amount of urea available to the animal. It has been found that urea and its derivatives can be used to supply ¼ to ⅔ and preferably about ⅓ of the protein requirements. Inasmuch as, however, large quantities of urea per se under certain conditions are broken down by microorganisms and amidases present in the rumen of certain animals, giving free ammonia, care must be exercised to prevent excess formation of the ammonia in toxic concentrations. (J. S. Dinning and H. M. Briggs, Am. J. Physiol. 153, 41–46, 1948.)

Urea has generally been found to be toxic when employed in an amount above 2–3% of the feed and deaths of livestock have been caused in some instances by urea-containing feeds. As with most forms of synthetic nitrogen, urea must also be fed with an energy source for the bacteria, such as starch. In tests where urea was mixed with grass silage, the urea imparted a very objectionable odor and was unpalatable to dairy cows. Similarly, addition of urea to sorghum silage or corn silage decreased the palatability and at times lowered the carotene content.

The theory has also been advanced (Chemical Abstracts, vol. 42, 6659i, 1948), that the unpalatability of urea rations is due to the deleterious effect on the flora of the rumen. Furthermore, it is believed that the enzyme urease from soybean meal acts upon urea to form ukase which is a toxic substance to the animal.

Various other methods have been tried to incorporate nitrogen containing materials into the feed. It is evident that ammonium nitrate is unsuitable because of the toxicity of the nitrate radical. Diammonium phosphate has been used, but this material in conjunction with moisture gives off ammonia which affects the palatability of the feed. In addition, diammonium phosphate has too much phosphorus per unit of nitrogen. Ammoniated beet pulp has been tried, but palatability suffered and tests also indicated that this treatment of beet pulp lowered its feeding value for sheep instead of increasing it. Ammoniated molasses has also been tested as well as ammoniated citrus pulp. These products also suffer from the disadvantage of decomposition on heating or on contact with water. Since all feeds nesessarily contain a considerable quantity of moisture, storage and palatability becomes a problem.

Ammonium bicarbonate has been fed to ruminants and has approximately the same feeding value based on nitrogen content as urea. However, a considerable quantity of ammonia was lost by volatilization when feed containing it was stored.

It has also been proposed to use compounds related to urea, such as guanidine (imino urea) creatine and creatinine. However, certain of these compounds are relatively expensive. Others suffer from the disadvantage that they either have a high initial ammonia evolution or if the ammonia evolution is initially low, this is later increased. Such is true for example of creatine and creatinine. Some of the compounds also affect the cellulose digestion adversely, either by reducing it immediately or after a period of several days.

It is evident from the above that it is impossible to predict which of the numerous compounds that theoretically could be employed actually can be used to supplement the protein feed for the microflora of ruminants.

Additionally, certain nitrogen compounds which would otherwise appear acceptable are unstable on storage and, hence, lower the palatability of the feed. In storage, moisture and the other ingredients in the feed cause a slow liberation of ammonia which not only lowers the nitrogen content of the feed, but also suffers from the disadvantage that the animals detect the ammonia itself in very small quantities. Basic compounds are generally undesirable in that, on storage they release ammonia in large proportions, thus rendering the feed composition completely unpalatable.

The feeding of nitrogen as such is not sufficient for the ruminant to produce all the essential amino acids, since many of the amino acids contain other elements, such as sulfur. Sulfur-containing amino acids occur in the natural proteins, so that this deficiency does not occur when such are employed. Thus, improved utilization of nitrogen in conversion to proteins and amino acids is obtained by the inclusion of sulfur-containing compounds, so that the bacteria will have sufficient sulfur available to make sulfur containing proteins and amino acids. The amount of sulfur added, however, should not be sufficient to cause any undesired toxic or laxative effects in the animals.

In addition to the need for nitrogen and sulfur, growing farm animals or milk producing animals need considerable quantities of phosphorus compounds. Present day farm animals suffer from substantial deficiency of phosphorus because the supply of this material in feeds, particularly in roughages, has decreased with the continued depletion of the phosphorus content of soils and also because the rates of production of meat and milk have been increased through breeding and improved feeding and management, so that the requirements of the animals are greater. In cases of phosphorus deficiency, animals have poor appetites, eat less than normal and only poorly utilize the feed they do consume.

Supplements containing nitrogen and phosphorus in the feeds must contain a minimum of fluorine. Not only is fluorine an active poison, but its effect is cumulative. Even when small amounts are consumed over a long period of time, the teeth and bones are affected. The Committee on Animal Nutrition of the National Research Council has recommended that there be not more than 0.003% fluorine in the total dry ration for cattle and sheep.

An object of the present invention is to provide a new source of usable nitrogen to supplement the protein feed for the microflora of Ruminantia.

Another object is to provide from dicyandiamide and its non-toxic derivatives, as sources of nitrogen, a supplemental feed in which the usable synthetic nitrogen ration of ruminants may be increased and the potential hazards resulting from ammonia evolution minimized.

Another object is to provide nitrogen in the form of a nitrogen derivative suitable for conversion into protein equivalents for ruminants, i. e., in a form in which it can be converted by the action of bacteria within the animal, assisted by normal body processes and the animal nutrients.

It is a further object of this invention to provide nitrogen in the form of a nitrogen derivative which remains stable in the feed even after long storage.

A still further object is to provide a usable source of nitrogen for ruminants in conjunction with available phosphorus values for the animals.

An additional object is to provide nitrogen in a palatable form for ruminants.

Another object is to provide a usable source of nitrogen in conjunction with available sulfur.

Still another object is to provide a source of nitrogen for ruminants which will not interfere with cellulose digestion.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that a suitable substance for providing nitrogen or nitrogen and phosphorus and/or sulfur in a combined form in order to attain the objectives set forth above is dicyandiamide or its addition or condensation products with a non-toxic acid, such as sulfuric acid, phosphoric acid, hydrochloric acid, propionic acid and acetic acid. Nitric acid is unsuitable because of its toxicity. These materials can be used to supplement the protein feed of ruminants with a minimum requirement for restricting the ingestion of the dicyandiamide or its derivatives. These compounds do not have a high ammonia release, such release being considerably less than with urea, and they provide nutrients for the rumen micro-organisms in their digestion of cellulose which maintain the digestion at a relatively stable rate.

The use of dicyandiamide per se and its condensation product with phosphoric acid gives preferred results.

It is preferred that the final feed composition containing the dicyandiamide or its salt or addition product with an acid has a pH of 8 or below and, it is especially preferred that the pH be under 7, so that the nitrogen content and palatability can be maintained. Most preferably, the pH is 5 to 7, although a pH as low as 3.5 can be used in some instances.

Examples 1 to 8 show the preparation of various derivatives of dicyandiamide. It will be noted from Example 7, that a part of the dicyandiamide can be replaced by urea, although, care should be taken that the urea is not employed in an amount to cause an unduly high ammonia formation or to cause toxicity.

Some of the addition or condensation products formed in Examples 1 to 6 and 8 are salts of dicyandiamide with the acids per se or the acids formed by partial decomposition of the ammonium salts employed. It should be noted that, in place of the phosphoric acid used in Examples 1 and 8, there can also be employed sulfuric acid, hydrochloric acid, propionic acid, acetic acid or any other non-toxic acid or mixtures of such acids with each other or with phosphoric acid. The term acid in the present specification and claims is intended to include acid reacting salts, such as sodium acid sulfate, monosodium phosphate, ammonium chloride, diammonium phosphate and triammonium phosphate, etc.

EXAMPLE 1

15 grams of 75% orthophosphoric acid were added to 30 grams of dicyandiamide with agitation. The dicyandiamide used contained 65.74% nitrogen. After the reaction, the product was allowed to air dry and, on analysis, it contained 44.48% nitrogen and 7.5% phosphorus.

EXAMPLE 2

84 grams of dicyandiamide were fused for a short time with 71 grams of diammonium phosphate. Some ammonia was evolved during the reaction. The reaction product contained 48.91% nitrogen.

EXAMPLE 3

The reaction was carried out exactly as in Example 2, except the total time elapsed for fusion was 20 min. The resulting material had a nitrogen content of 43.49%. The loss in fusion in this reaction was 5.5 grams when 35.5 grams of diammonium phosphate were fused with 42 grams of dicyandiamide. The pH of the product was 6.0.

EXAMPLE 4

71 grams of diammonium phosphate were fused with 42 grams of dicyandiamide. 13 grams were lost during the fusion. The nitrogen contained was 35.6%, compared to a theoretical value of 37.75%, for the compound $(H_2NCN)_2 \cdot (NH_4)_2HPO_4$. The pH of the product was 6.

EXAMPLE 5

34 grams of diammonium sulfate were fused with 42 grams of dicyandiamide. The loss of weight during the fusion was 3 grams. The nitrogen content of the finished product was 44.35%, compared to a theoretical value of 45.82%. The pH was 5.

EXAMPLE 6

57 grams of mono-ammonium phosphate were fused with 42 grams of dicyandiamide. The loss in weight during the fusion was 11.8 grams. The nitrogen content of the finished product was 27.2%, and the pH was 5.0

EXAMPLE 7

42.0 grams of dicyandiamide were fused with 28 grams of urea until 11.8 grams were lost. This product had a 54.9% nitrogen analysis and a pH of 5.0.

EXAMPLE 8

42 grams of dicyandiamide were fused with 28.5 grams of 86% phosphoric acid. The weight lost during the fusion was 6.5 grams. Analysis of the product showed 39.16% nitrogen, a phosphorus content of 12.5% and a pH of 6.0.

To insure a well balanced diet, conventional sources of calcium, e. g., calcium carbonate and mono- or dicalcium phosphate can be added to a feed mixture containing dicyandiamide or any of its derivatives, addition or condensation products of the present invention.

In Table I are shown typical feeds according to the present invention which were fed to ten steer weighing approximately 600 pounds each.

Table I

| Ingredients | Feed Formulation (parts per 100 parts) | | | |
|---|---|---|---|---|
| | 1 | 2 | 3 | 4 |
| Corn silage | 38 | 38 | 38 | 38 |
| Ground corn | 58 | 58 | 58 | 58 |
| Molasses | 2 | 2 | 2 | 2 |
| Dicalcium phosphate | | | 0.5 | 1 |
| Monocalcium phosphate | 1 | 0.5 | | |
| Calcium carbonate | | | | 1 |
| Dicyandiamide | 1 | | | |
| Compound of Example 1 | | 1 | | |
| Compound of Example 3 | | | 0.8 | |
| Compound of Example 8 | | | | 1 |

Work with cattle and sheep, in order to determine the value of feeds generally, has been conducted until recently directly by feeding the animal. Within the past few years an in vitro rumen and technique for its use have been developed whereby the changes taking place in feeds, brought about by micro-organisms, can be measured more readily and accurately. This technique involves the use of an apparatus in which the digestive processes of the animal are conducted and can be studied in vitro. By this means, various animal feeds are introduced into or withdrawn from the laboratory unit under carefully controlled conditions and the changes taking place studied critically and progressively during the consumption of the feed by the micro-organisms.

While the type of results obtained with a test compound with one rumen are generally of the same order as the results obtained with a different rumen, still, the rumen used to inoculate the flask will effect the control values. Hence it is necessary in each instance to run a blank for comparison with the compound to be tested.

If, for example, a compound proves to aid the digestion of cellulose by one rumen, it will also aid the digestion of cellulose by other rumen, although the blank values will vary, due to the differences in the rumen.

The results obtained by use of the aforesaid transplanted rumen technique have been confirmed by actual feeding of animals. This technique has established, for example, that protein addition to the feed substantially increases the consumption of cellulose by the animals and that also an increase in usable nitrogen to supplement protein feeds, likewise, improves ability to consume cellulose. The aforesaid and other results were determined first by laboratory experiments working in vitro and were later established in vivo by direct feeding of animals.

The feed supplements of the present invention are dicyandiamide and its condensation or addition products, e. g., salts, with non-toxic acids or the ammonium salts of such acids. These substances not only supply a source of biologically active nitrogen as a nutrient for rumen microflora, but also give a limited evolution of ammonia during ingestion. The low amount of ammonia evolution determined in vitro is an assurance that these feed supplements can be used with wide latitudes in the composition of feeds. In all the examples, parts are by weight, unless otherwise indicated.

Dicyandiamide per se is an especially preferred material in view of its very high nitrogen content of 66.7%, as contrasted to 46.7% for urea. Thus, less dicyandiamide is required in order to make available the same amount of nitrogen. Guanidine, which has previously been proposed (Walker U. S. Patent 2,630,386) as a nitrogen source in a ruminant feed, has a nitrogen content of 71.2%. However, guanidine is too basic to use as such and, hence, Walker found it necessary to employ it as its carbonate which thus reduced the available nitrogen to 46.7%, the same as for urea.

The procedure used in carrying out Example 9 was as follows:

Into an Erlenmeyer flask of approximately 1 liter capacity was introduced 9 grams of cellulose, 0.6 gram of molasses ash, 70 cc. of a nutrient salt solution, 1 gram of glucose, and 450 cc. of a rumen inoculum, the mixture being diluted to 900 cc. with distilled water.

The nutrient salt solution contained a mixture of metal salts of the following composition:

| | Grams |
|---|---|
| Sodium phosphate, monobasic | 52.50 |
| Sodium bicarbonate | 52.50 |
| Ammonium sulfate | 37.50 |
| Potassium chloride | 7.50 |
| Sodium chloride | 7.50 |
| Magnesium sulfate | 2.25 |
| Calcium chloride | 0.75 |
| Ferrous sulfate | 0.15 |

Rumen inoculum was obtained from the first stomach of a fistulated steer which had been fed with a diet consisting of grain concentrate, alfalfa hay and salt mixture. The extracted rumen content was filtered through four thicknesses of cheesecloth or muslin of comparable porosity to remove solid matter, the liquid filtrate being employed as the rumen inoculum. During the removal and filtration of the rumen contents, care was exercised to exclude air.

The Erlenmeyer flask was charged with 450 cc. of this rumen liquid to which was added 450 cc. of a distilled water suspension or solution of the aforementioned basal medium plus the nutrient to be evaluated. This flask was placed in a constant temperature water bath maintained at approximately 39° C. and carbon dioxide pumped through the charge in the flask to maintain anaerobic conditions.

At the end of the first 24 hours of bacterial digestion, a sample was taken for analysis to determine ammonia, cellulose digestion and bacterial growth. After 24 hours digestion, new nutrients in water were inoculated with half (450 cc.) of the previous day's fermentation and diluted to 900 ml. with water. The analyses and subculturing into new nutrients was repeated over a 4 day period.

In Example 9, a comparison was made between dicyandiamide and urea. These comparisons were for cellulose digestion, as well as ammonia evolution of the compositions examined. The compositions were also compared with a blank composition containing only cellulose, molasses ash, nutrient salt solution and rumen inoculum. The necessity for comparison with a blank has been previously set forth.

EXAMPLE 9

FLASK CONTENTS

|  | 1 | 2 | 3 |
|---|---|---|---|
| Cellulose, grams | 9 | 9 | 9 |
| Molasses ash, grams | 0.6 | 0.6 | 0.6 |
| Nutrient salt solution, milliliters | 70 | 70 | 70 |
| Dextrose, grams | 1 | 1 | 1 |
| Urea, grams |  | 0.40 |  |
| Dicyandiamide, grams |  |  | 0.28 |
| Rumen, inoculum, milliliters | 450 | 450 | 450 |
| Water | dilute to 900 milliliters | | |

The amounts of urea and dicyandiamide were each equivalent to 0.187 grams of nitrogen.

HEIGHT OF AMMONIA (MILLIGRAMS)

|  | 1 | 2 | 3 |
|---|---|---|---|
| At end of: |  |  |  |
| first day | 76.5 | 107.1 | 82.5 |
| second day | 43.0 | 83.0 | 55.0 |
| third day | 24.5 | 71.2 | 37.0 |
| fourth day | 12.4 | 62.3 | 24.6 |
| Average | 39.1 | 80.9 | 49.8 |

CELLULOSE DIGEST (PERCENT)

|  | 1 | 2 | 3 |
|---|---|---|---|
| At end of: |  |  |  |
| first day | 43 | 44 | 41 |
| second day | 33 | 35 | 27 |
| third day | 10 | 35 | 27 |
| fourth day | 0 | 0 | 30 |
| Average | 22 | 29 | 31 |

Analysis of the digested blank product of Example 9 reveals that the ammonia evolution decreased from the first to the end of the fourth day from 76.5 to 12.4 mg., while the cellulose digestion averaged 22% for the four days, the greatest digestion occurring on the first day, falling off to zero at the end of the fourth day. With urea as the nitrogen supplement, the ammonia evolution in Example 9 averaged 80.9 mg., and the cellulose digestion 29%. While the cellulose digestion is augmented by the presence of urea, it is significant that the ammonia evolution is quite high. Moreover, by the end of the fourth day, the cellulose digestion was reduced to zero. These factors are in contrast with the rumen inoculum containing dicyandiamide in which the ammonia evolution averaged 49.8 mg., ranging from a high of 82.5 mg. on the first day to a low of 24.6 mg. on the fourth day, while the cellulose digestion averaged 31%. Thus, the cellulose digestion was slightly superior to that of urea and of equal importance, the cellulose digestion was much more uniform over the four day test period. On the other hand, the ammonia evolution was considerably lower than with urea. Also dicyandiamide is safer to use than urea, as dicyandiamide does not react with the enzymes, e. g., urease, in soya bean meal which is present in most feeds and, hence, there is no need to limit the dicyandiamide in the feed to 3%, as is the case with urea.

In the formulation of feeds for cattle, goats, and sheep, the dicyandiamide or its derivatives can be used to supply from 5 to 90% of the nitrogen content of the protein requirements for the animal. This is a general rule that can be followed for complete rations for the production of protein concentrate mixtures or for the preparation of pelleted products. In the preparation of such formulated feeds, it is desirable that the synthetic nitrogen constituents thereof be preferably dry mixed with the other feed ingredients, so that they can be evenly distributed throughout the feed. Any suitable mixture may be employed as, for example, a 14% protein feed can be made into an 18% feed composition by the addition of a little over 19 pounds of dicyandiamide or, alternatively, about 29 pounds of the compound formed in Example 1, or a little over 26 pounds of the compound of Example 2, or a little over 29 pounds of the compound of Example 3, or about 36 pounds of the compound of Example 4, or about 29 pounds of the compound of Example 5, or over 46 pounds of the compound of Example 6, or a little over 23 pounds of the blend of Example 7, or slightly under 33 pounds of the compound of Example 8 per ton of feed.

The usual type of feed composition is employed to provide the normal amount of carbohydrate content which may be supplied by wheat, oats, barley, corn, hominy, molasses and the like. These feeds may also contain oil meals and similar meals to supply natural proteins. For example, a typical 20% dairy ration for cattle can contain 300 lbs. of wheat bran, 310 lbs. of hominy feed, 270 lbs. of crimped oats, 300 lbs. of distillers' dried grains, 175 lbs. of corn gluten feed, 400 lbs. of cocoanut oil meal, 10 lbs. of soybean oil meal, 150 lbs. of molasses, 130 lbs. of dicyandiamide, 17 lbs. of brewers' dried grains and 50 lbs. of minerals and salt.

In place of the dicyandiamide, there can be used 200 pounds of the compound of Example 1, or 180 pounds of the compound of Example 2, or 200 pounds of the compound of Example 3 or 250 pounds of the compound of Example 4 or 200 pounds of the compound of Example 5 or 160 pounds of the blend of Example 7 or 230 pounds of the compound of Example 8. To adjust the feed composition to a ton when these derivatives or additional products of dicyandiamide are employed, the crimped oats are also varied so that the total of the crimped oats and the derivative of dicyandiamide is 400 pounds. Thus, when the compound of Example 1 is employed there are used 200 pounds of crimped oats and when the compound of Example 2 is employed, there are used 220 pounds of crimped oats.

Cattle are usually supplied with a diet of grass, hay and the like, augmented by a food concentrate such as that described in the last paragraph. These feed concentrates may contain from 10 to 50% protein, a small amount of minerals and the remainder mainly carbohydrate. The minerals may be added directly to the feed concentrate. When preparing the concentrate in this manner such minerals, as e. g., defluorinated phosphate rock, salt and the like may be used. Contrariwise, the minerals may be indirectly added with the carbohydrate and/or protein as a normal part of those ingredients.

When using the derivatives of dicyandiamide they can replace part of the minerals, as the dicyandiamide phosphate, for example, will be a source of phosphate and the dicyandiamide sulfate will be a source of sulfur, both of which elements are essential in a proper diet for cattle.

In preparing the feed concentrates, it has been found that the dicyandiamide or its derivatives, e. g., the reaction products with phosphoric acid, acetic acid, hydrochloric acid and sulfuric acid, preferably constitute 5 to 90% of the nitrogen content of the feed, the remainder of the nitrogen being provided by protein.

The invention is not limited to the specific compositions described, nor to their specific proportions for the rate of utilization and its efficiency, as will be appreciated by those skilled in the art, is determined in large measure by the availability of the nitrogen to the rumen microorganisms and as a consequence, the percentage ingestion of dicyandiamide or its non-toxic derivatives that can be used varies over a wide range in accordance with the nitrogen content of that feed supplement.

I claim:

1. A ruminant feed composition containing carbohydrates and proteins and as a supplementary source of nitrogen a compound selected from the group consisting of dicyandiamide and its condensation products with non-toxic acids, and the acid reacting salts of such acids.

2. The feed composition of claim 1, wherein the nitrogen source comprises dicyandiamide per se.

3. The feed composition of claim 1, wherein the nitrogen source comprises an addition product of dicyandiamide with an acid selected from the group consisting of sulfuric acid, acetic acid, propionic acid, phosphoric acid and hydrochloric acid.

4. The feed composition of claim 1, wherein the nitrogen source comprises an addition product of dicyandiamide with phosphoric acid.

5. The feed composition of claim 1, wherein the nitrogen source comprises a condensation product of dicyandiamide with an ammonium phosphate.

6. A supplemental feed for rumen microflora which comprises carbohydrates and proteins and as a supplementary source of nitrogen, other than protein, a compound selected from the group consisting of dicyandiamide and its addition products with non-toxic acids and their acid reacting salts.

7. The supplemental feed of claim 6, in which said compound comprises dicyandiamide per se.

8. A ruminant feed composition suitable for the in vivo and in vitro feeding of rumen microflora containing carbohydrates, protein and as a supplementary source of nitrogen a compound selected from the group consisting of dicyandiamide and its addition products with non-toxic acids and their acid reacting salts.

9. The feed of claim 8, in which said compound comprises dicyandiamide per se.

10. A ruminant feed composition containing carbohydrates, minerals, proteins, and as a supplementary source of nitrogen a compound selected from the group consisting of dicyandiamide and its condensation products with non-toxic acids and their acid reacting salts supplying from 5 to 90% of the nitrogen content of the feed.

11. The ruminant feed of claim 10, in which said compound comprises dicyandiamide.

12. A ruminant feed composition containing from 10 to 50% protein, minerals and the remainder mainly carbohydrate products and as a supplementary source of nitrogen a compound selected from the group consisting of dicyandiamide and its condensation products with non-toxic acids and their acid reacting salts supplying from 5 to 90% of the nitrogen content of the feed.

13. The ruminant feed of claim 12, in which said compound comprises dicyandiamide per se.

14. A ruminant feed composition suitable for the in vivo and in vitro feeding of rumen microflora, containing carbohydrates, protein and dicyandiamide as a supplementary source of nitrogen.

15. A ruminant feed composition suitable for the in vivo and in vitro feeding of rumen microflora containing carbohydrates, protein and a non-toxic dicyandiamide salt as a supplementary source of nitrogen.

16. The ruminant feed of claim 15, in which the salt is a phosphate.

17. A ruminant feed composition containing carbohydrates and proteins and as a supplementary source of nitrogen the condensation product of dicyandiamide with an ammonium salt of a non-toxic acid.

18. The feed composition of claim 17, wherein the salt is an ammonium salt of an acid selected from the group consisting of sulfuric acid, acetic acid, propionic acid, phosphoric acid and hydrochloric acid.

References Cited in the file of this patent

UNITED STATES PATENTS 2,630,386    Walker _____ Mar. 3, 1953

FOREIGN PATENTS 749,109    Germany _____ 1944